(12) United States Patent
Bollinger

(10) Patent No.: US 12,035,724 B1
(45) Date of Patent: Jul. 16, 2024

(54) PORTABLE FISH CLEANING STATION FOR USE WITH BOAT

(71) Applicant: Samuel T Bollinger, Graceville, FL (US)

(72) Inventor: Samuel T Bollinger, Graceville, FL (US)

( * ) Notice: Subject to any disclaimer, the term of this patent is extended or adjusted under 35 U.S.C. 154(b) by 0 days.

(21) Appl. No.: 18/431,958

(22) Filed: Feb. 3, 2024

(51) Int. Cl.
| | |
|---|---|
| A22C 25/00 | (2006.01) |
| A22C 25/06 | (2006.01) |
| A22C 25/14 | (2006.01) |
| A47B 5/02 | (2006.01) |
| A47B 5/04 | (2006.01) |
| B63B 29/00 | (2006.01) |

(52) U.S. Cl.
CPC .............. *A22C 25/06* (2013.01); *A22C 25/14* (2013.01); *A47B 5/02* (2013.01); *A47B 5/04* (2013.01); *B63B 29/00* (2013.01)

(58) Field of Classification Search
CPC ......... A22C 25/06; A22C 26/08; A22C 25/02; A47G 5/02; A47G 5/04
USPC ....................................................... 452/194
See application file for complete search history.

(56) References Cited

U.S. PATENT DOCUMENTS

| | | | |
|---|---|---|---|
| 3,668,739 A | 6/1972 | Lewis | |
| 4,229,858 A | 10/1980 | Baxter et al. | |
| 4,454,628 A | 6/1984 | Olsen | |
| 5,098,338 A * | 3/1992 | Jensen | A22C 25/06 452/194 |
| 6,554,691 B1 | 4/2003 | Schauls | |
| 7,322,880 B1 * | 1/2008 | Babiana | A22C 25/06 452/194 |
| 2004/0147212 A1 * | 7/2004 | Leili | A22C 25/06 452/173 |
| 2005/0009462 A1 * | 1/2005 | Mickelson | A22C 25/06 452/173 |
| 2007/0178820 A1 | 8/2007 | Tylman | |

* cited by examiner

*Primary Examiner* — Richard T Price, Jr.
(74) *Attorney, Agent, or Firm* — George L Williamson

(57) ABSTRACT

Method and apparatus for a portable fish cleaning station which can be removably attached to the outside surface of the gunwale of a hull of a boat so that the device can be easily portable from one boat to another boat. The device includes a cutting board mounted on left and right pivoting and telescoping frame members which are pivotally connected to a generally rectangular shaped plane so that the frame can be easily attached and removed from the gunwale of a boat. The cutting board is attached to left and right frame members which have telescoping legs or spacers which are useful for leveling the cutting board against the side of the hull of the boat in order to prevent the hull of the boat from being scratched by the frame. The spacers are also useful to level the cutting board into an appropriately level cutting position. An elongated hook is attached to an upper end of the rectangular frame so that the device can be mounted to a boat.

12 Claims, 2 Drawing Sheets

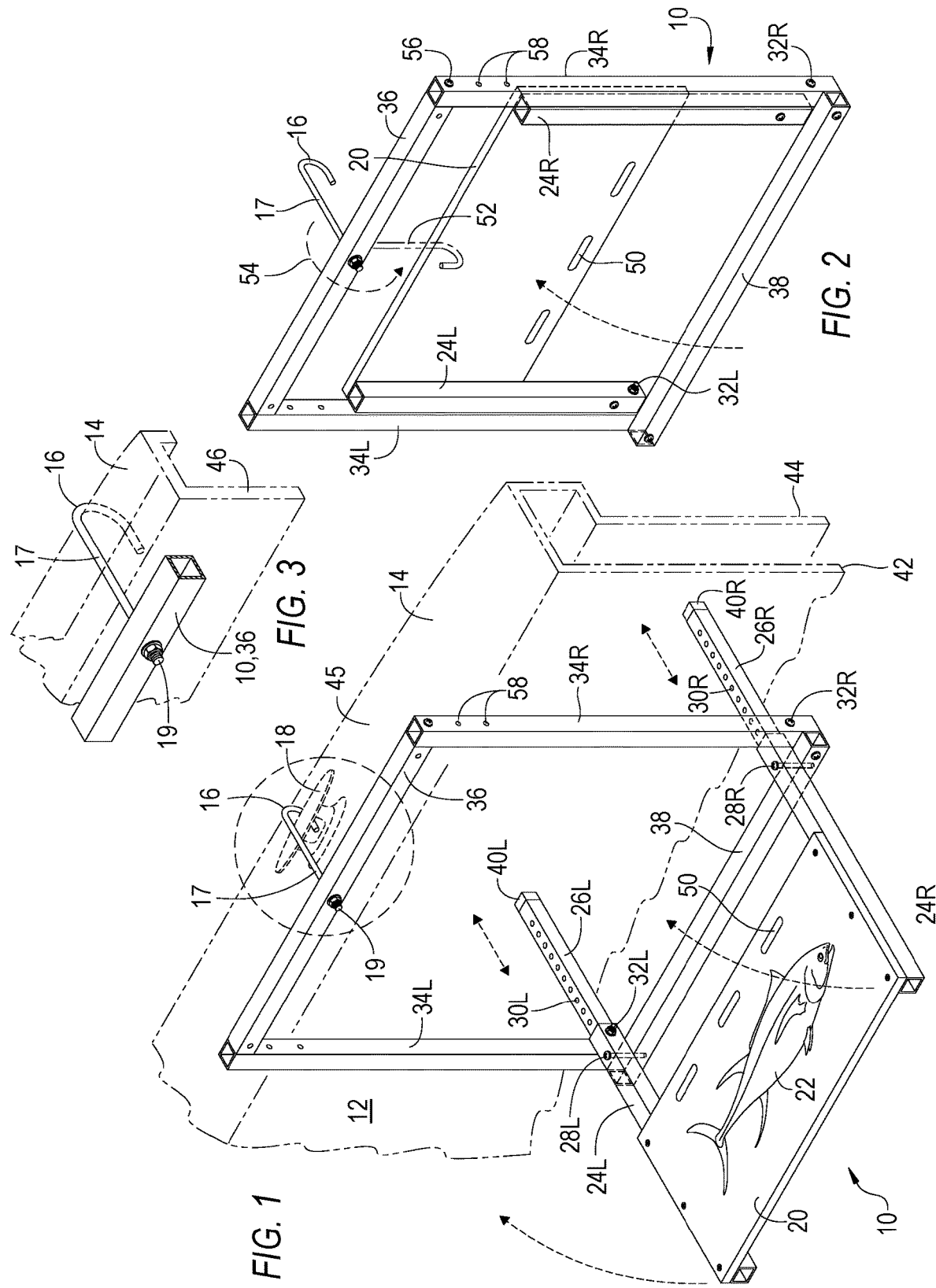

PORTABLE FISH CLEANING STATION FOR USE WITH BOAT

PRIOR ART

Devices relevant to the present invention have been described in the related art; however, none of the related art devices disclose the unique features of the present invention. In U.S. Patent Application Publication No. 2004/0147212, dated Jul. 29, 2004, Leili, et al., disclosed a portable legless fish cleaning station. In U.S. Patent Application Publication No. 2007/0178820, dated Aug. 2, 2007, Tylman disclosed a fish cleaning and filleting device. In U.S. Pat. No. 4,229,858, dated Oct. 28, 1980, Baxter, et al., disclosed a boat mountable fish cleaning tray. In U.S. Pat. No. 3,668,739, dated Jun. 13, 1972, Lewis disclosed a fish cleaning trough for boats. In U.S. Pat. No. 6,554,691, dated Apr. 29, 2003, Schauls disclosed a fish cleaning station. In U.S. Pat. No. 5,098,338, dated Mar. 24, 1992, Jensen disclosed a portable fish cleaning device. In U.S. Pat. No. 4,454,628, dated Jun. 19, 1984, Olson disclosed a table for use in cleaning fish. In U.S. Pat. No. 7,322,880, dated Jan. 29, 2008, Babiana, et al. disclosed a collapsible angler workstation.

While these devices may be suitable for the purposes for which they were designed, they would not be as suitable for the purposes of the present invention as hereinafter described. As will be shown by way of explanation and drawings, the present invention works in a novel manner and differently from the related art.

BACKGROUND OF THE INVENTION

The present invention relates generally to devices used to clean fish and, more particularly, is concerned with a fish cleaning device for removable attachment to the side of a boat.

SUMMARY OF THE INVENTION

The present invention discloses a portable fish cleaning station which can be removably attached to the outside surface of the gunwale of a hull of a boat so that the device can be easily moved from one boat to another boat and from one occasion of use to another occasion for use. The present invention includes a cutting board mounted on left and right pivoting and telescoping frame members which are pivotally connected to a generally rectangular shaped frame so that the frame can be easily attached and removed from the gunwale of a boat. The cutting board is attached to left and right frame members which have telescoping legs or spacers which are useful for leveling the cutting board against the side of the hull of the boat in order to prevent the hull of the boat from being excessively and unnecessarily scratched by the frame of the present invention and also, the spacers are useful to level the cutting board into an appropriately level cutting position. An elongated hook is attached to an upper end of the rectangular frame so that the present invention can be alternatively connected to, for example, a cleat disposed on the gunwale of the boat, or the frame of a johnboat, or to a steel rail disposed along the upper surface of the gunwale of the boat or the like.

An object of the present invention is to provide a portable fish cleaning station which can be easily moved from one boat to another. A further object of the present invention is to provide a fish cleaning station which can be folded so that it can be easily stored in a space-saving manner which is useful on a fishing boat. A further object of the present invention is to provide a fish cleaning station which can be attached in numerous ways to the gunwale of a boat. A further object of the present invention is to provide a fish cleaning station which can be easily operated by a user. A further object of the present invention is to provide a fish cleaning station which can be relatively easily and inexpensively manufactured.

The foregoing and other objects and advantages will appear from the description to follow. In the description reference is made to the accompanying drawings, which form a part hereof, and which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF DRAWINGS

In order that the invention may be more fully understood, it will now be described, by way of example, with reference to the accompanying drawings in which:

FIG. 1 is a perspective view of the present invention is shown in operative connection in an unfolded position.

FIG. 2 is a perspective view of the present invention shown in a folded position.

FIG. 3 is a detailed perspective view of the present invention showing an alternative mounting means of the present invention.

DETAILED DESCRIPTION OF THE INVENTION

Figure 7:
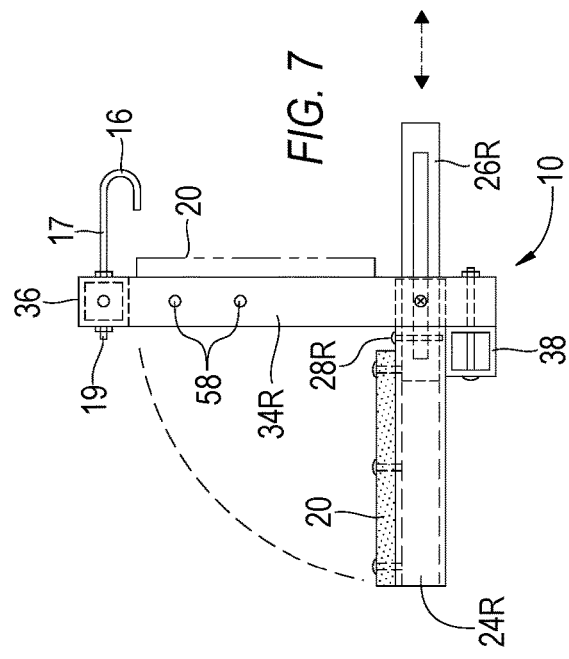
FIG. 7 is a side elevation view of the present invention.

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 7 illustrate the present invention wherein a portable fish cleaning station for attachment to the outside surface of the gunwale of a boat is disclosed and which is generally indicated by reference number 10.

Turning to FIG. 1, therein is shown a perspective view of the present invention 10 attached to the outside surface 12 of the gunwale 14 of the hull of a boat using an elongated hook 16 attached to a cleat 18 disposed on the top of the gunwale of the boat. The hook 16 has an elongated shank 17 with a threaded end 19 suitable for receiving a mating nut for attachment to an upper cross frame member 36. A planar cutting board 20 is shown having a fish 22 thereon with the board 20 being mounted on left and right 24L, 24R frame members having telescoping legs 26L, 26R on a rear end of each side so that the legs 26L 26R are useful for adjusting the present invention 10 against the outside surface 12 of the hull of the boat in order to keep the cutting board 20 level and also in order to keep the present invention 10 from unnecessarily scratching the outside surface 12 of the boat hull. Legs 26L, 26R are telescopically mounted on the frames 24L, 24R using a plurality of pins 28L, 28R which are placed in a plurality of longitudinally spaced apart holes/apertures 30L, 30R which are mounted into the telescoping portion of the left and right legs 26L, 26R. The left and right frame 24L, 24R are pivotally connected at pivot points 32L, 32R to upright frame members 34L, 34R so that the cutting board 20 and its supporting frame members 24L, 24R can be folded upwardly and away for easy storage. The left and right upright frame members 34L, 34R are joined with an upper cross frame member 36 and lower cross frame member 38 which together form a rectangularly shaped framework wherein the upper cross member 36 is rotatable about its longitudinal central axis using pivotable fasteners 56 and is movable vertically along the left and right vertical frame members 34L, 34R using spaced apart apertures 58 to permit the height of the upper cross member to be adjusted. Note that the lower cross frame member 38 is disposed on the front surface of the left and right upright frame members 34L, 34R so that when the cutting board 20 is folded upwardly it can be mounted flush with the left and right frame members 34L, 34R as illustrated in FIG. 2 which provides a space saving feature of the present invention 10. Rubber end caps 40L, 40R are shown on the ends of the left and right legs, 26L, 26R in order to prevent the outside surface 12 of the gunwale from being unnecessarily scratched. The gunwale 14 of the boat illustrates a multi-layer boat hull having an outer layer 42 and an inner layer 44 which together form a multi-layer hull with a cleat 18 mounted on the upper surface thereof. The outer layer 42 and inner layer 44 form a multi-layer wall having an enlarged portion at its upper surface so that a cleat 18 can be easily mounted onto the upper surface 45 of the gunwale 14. The cutting board 20 includes a plurality of spaced apart drainage apertures or knife holder 50 to allow waste to drain away from the cutting board 20 and for holding utensils.

Turning to FIG. 2, therein is shown a perspective view of the present invention 10 showing the cutting board 20 pivoted in an upward direction for easy storage of the present invention 10 onto a boat. Previously disclosed elements are shown along with the underside of the cutting board 20. The pivoting capability of the cutting board 20 is clearly illustrated which is a major benefit for use on a boat where space saving accessories are an advantage. The elongated hook 16 has a hook 16 on one end and a free end on a second end, wherein the free end of the elongated hook is joined to the upper cross member 36 and the hook is removably attachable to the gunwale 14 of the boat for attaching the fish cleaning station 10 to the boat and also the elongated hook has a horizontal position for removable attachment to the gunwale of the boat and a vertical position for stowage of the fish cleaning station which is accomplished using the rotatable feature of upper cross member 36 and fasteners 56. Upper cross member 36 is vertically adjustable using the spaced apart apertures 58 as previously disclosed.

Turning to FIG. 3, therein is shown a detailed perspective view showing the elongated hook 16 of the present invention 10 attached to an alternative type of gunwale 14 having a wall section which is composed of a single layer wall 46. This type of wall construction is commonly found in small boats like Jon boats made of aluminum or the like which have very thin hulls without cleats with which the present invention 10 can easily be attached thereto with the elongated hook 16 being attached over the upper surface of the gunwale 14 of the hull of the boat.

Figure 4:
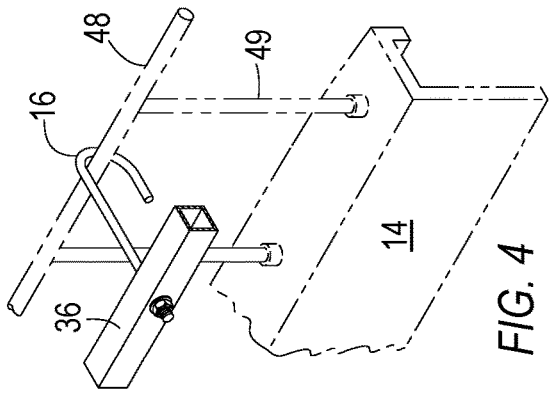
FIG. 4 is a detailed perspective view of the present invention showing an alternative mounting means of the present invention.

Turning to FIG. 4, therein is shown a detailed perspective view showing the elongated hook 16 of the present invention 10 being attached to a rail 48 such as is commonly found on the gunwale 14 of boats and which rail can be used for many purposes such as being gripped by the and of a user or for tying a rope thereto which might be useful in mooring or docking the boat. The rail 48 also has a support leg 49 for connection to the gunwale 14 of the hull of a boat.

Figure 5:
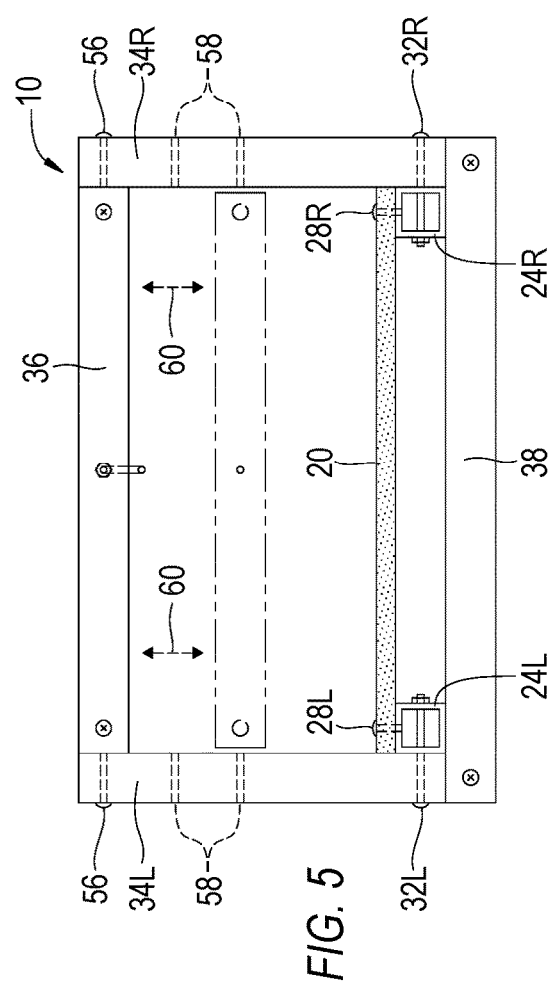
FIG. 5 is a front elevation view of the present invention.
Figure 6:
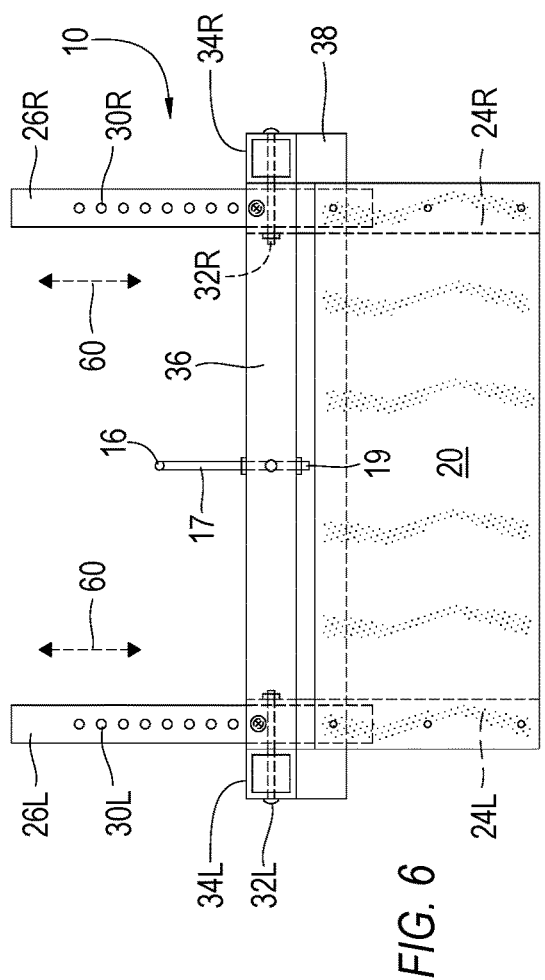
FIG. 6 is a top view of the present invention.

Turning to FIGS. 5-7, therein are shown additional views of the present invention 10 including previously disclosed elements and features.

The present invention 10 could be constructed of any suitable material such as wood, plastic, fiberglass, aluminum or the like. The fasteners could be of any suitable type useful for joining pieces of construction such as screws, brads, rivets or the like, or, the pieces could be joined by welding, gluing or the like depending on the type of material the present invention 10 was made from.

Exemplary dimensions of the present invention 10 follow: The length of the upper cross frame member 36 is approximately 27 inches, ranging from 21 to 36 inches. The length of the left and right frame members 34L, 34R is approximately 20 inches ranging from 14 to 26 inches. The depth of the cutting board 20 is approximately 18 inches ranging from 14 to 24 inches. The length of the left and right legs is approximately 10 inches ranging from 7 to 14 inches. The length of the elongated hook 16 is approximately 8 inches ranging from 5 to 12 inches.

Lines with arrowheads are sometimes placed on drawings to indicate potential motion or direction of movement of an item illustrated in the drawing.

The invention claimed is:

1. A fish cleaning station for removable attachment to a gunwale of a boat, comprising:
    a) a rectangular cutting board having left and right ends and front and rear edges;
    b) a left and a right pivoting frame member wherein said left end of said cutting board is attached to an upper surface of said left pivoting frame member and said right end of said cutting board is attached to an upper surface of said right pivoting frame member and wherein each said left and right pivoting frame member has corresponding telescoping legs, wherein each said corresponding telescoping leg has an end thereon for making contact with an outer surface of the gunwale of the boat;
    c) wherein each said corresponding telescoping leg is adjustable in length to permit the distance between said cutting board and the boat to be varied;
    d) a left and a right vertical frame member each having upper and lower ends, wherein said left pivoting frame member is pivotally mounted on an inner surface of said left vertical frame member and said right pivoting frame member is pivotally mounted on an inner surface of said right vertical frame member to permit said cutting board to pivot from an extended position to a folded position;
    e) a lower cross member extending between a front surface of said lower ends of said left and right vertical frame member and an upper cross member extending between said upper ends of said left and right vertical frame member;

f) wherein said upper cross member is rotatable about its longitudinal central axis and is movable vertically along said left and right vertical frame members to permit the height of said upper cross member to be adjusted;

g) an elongated hook having a hook on one end and a free end on a second end, wherein said free end of said elongated hook is joined to said upper cross member and said hook is removably attached to the gunwale of the boat for attaching the fish cleaning station to the boat; and h) wherein said elongated hook has a horizontal position for removable attachment to the gunwale of the boat and a vertical position for stowage of the fish cleaning station.

2. The fish cleaning station of claim 1, wherein when said upper cross member rotates about its longitudinal central axis said elongated hook moves between said horizontal position for removable attachment to the gunwale of the boat and said vertical position for stowage of the fish cleaning station.

3. The fish cleaning station of claim 1, wherein said hook is removably attachable to a cleat disposed on the gunwale of the boat.

4. The fish cleaning station of claim 1, wherein said hook is removably attachable directly to an upper surface of the gunwale of the boat.

5. The fish cleaning station of claim 1, wherein when said cutting board is in said folded position said left and right pivoting frame members are disposed inside said left and right vertical frame members.

6. The fish cleaning station of claim 1, wherein said cutting board has at least one aperture therein, wherein said at least one aperture is disposed adjacent said rear edge of said rectangular cutting board to permit a cutting utensil to be disposed therein.

7. A method of making a fish cleaning station for removable attachment to a gunwale of a boat, comprising the steps of:

a) providing a rectangular cutting board having left and right ends and front and rear edges;

b) providing a left and a right pivoting frame member wherein the left end of the cutting board is attached to an upper surface of the left pivoting frame member and the right end of the cutting board is attached to an upper surface of the right pivoting frame member and wherein each of the left and right pivoting frame member has corresponding telescoping legs, wherein each of the corresponding telescoping leg has an end thereon for making contact with an outer surface of the gunwale of the boat;

c) wherein each of the corresponding telescoping leg is adjustable in length to permit the distance between the cutting board and the boat to be varied;

d) providing a left and a right vertical frame member each having upper and lower ends, wherein the left pivoting frame member is pivotally mounted on an inner surface of the left vertical frame member and the right pivoting frame member is pivotally mounted on an inner surface of the right vertical frame member to permit the cutting board to pivot from an extended position to a folded position;

e) extending a lower cross member between a front surface of the lower ends of the left and right vertical frame member and extending an upper cross member between the upper ends of the left and right vertical frame member;

f) wherein the upper cross member is rotatable about its longitudinal central axis and is movable vertically along the left and right vertical frame members to permit the height of the upper cross member to be adjusted;

g) providing an elongated hook having a hook on one end and a free end on a second end, wherein the free end of the elongated hook is joined to the upper cross member and the hook is removably attached to the gunwale of the boat for attaching the fish cleaning station to the boat; and h) wherein the elongated hook has a horizontal position for removable attachment to the gunwale of the boat and a vertical position for stowage of the fish cleaning station.

8. The method of claim 7, wherein when the upper cross member rotates about its longitudinal central axis the elongated hook moves between the horizontal position for removable attachment to the gunwale of the boat and the vertical position for stowage of the fish cleaning station.

9. The method of claim 7, wherein the hook is removably attachable to a cleat disposed on the gunwale of the boat.

10. The method of claim 7, wherein the hook is removably attachable directly to an upper surface of the gunwale of the boat.

11. The method of claim 7, wherein when the cutting board is in the folded position the left and right pivoting frame members are disposed inside the left and right vertical frame members.

12. The method of claim 7, wherein the cutting board has at least one aperture therein, wherein the at least one aperture is disposed adjacent the rear edge of the rectangular cutting board to permit a cutting utensil to be disposed therein.

* * * * *